United States Patent [19]

Keith

[11] 4,047,435

[45] Sept. 13, 1977

[54] TEMPERATURE MEASURING APPARATUS

[75] Inventor: John L. Keith, Garland, Tex.

[73] Assignee: Rockwell International Corporation, El Segundo, Calif.

[21] Appl. No.: 690,206

[22] Filed: May 20, 1976

[51] Int. Cl.² ............................................. G01K 7/00
[52] U.S. Cl. ............................................. 73/362 SC
[58] Field of Search ...................... 73/362 SC; 357/28

[56] References Cited

U.S. PATENT DOCUMENTS

| | | | |
|---|---|---|---|
| 3,491,596 | 1/1970 | Dean | 73/362 SC X |
| 3,701,004 | 10/1972 | Tuccinardi et al. | 323/69 |
| 3,780,585 | 12/1973 | Milo | 73/362 SC |
| 3,791,217 | 2/1974 | Stout et al. | 73/362 SC X |
| 3,880,006 | 4/1975 | Poduje | 73/362 AR |
| 3,995,810 | 12/1976 | Banks | 73/362 SC X |

OTHER PUBLICATIONS

Huen, Tony; "Semiconductor Diode Low Temperature Thermometer;" Rev. Sci. Instr; vol. 41, No. 9; Sept. 1970; pp. 1368-1369; AU 244.

Primary Examiner—Richard C. Queisser
Assistant Examiner—John S. Appleman
Attorney, Agent, or Firm—Robert J. Crawford; Bruce C. Lutz

[57] ABSTRACT

Temperature sensing apparatus utilizing a single temperature sensing diode which is supplied with a constant level of current. The voltage across the diode having the constant current therethrough is compared with a constant voltage reference in a summing means and the deviation of the sensing diode with respect to the constant voltage reference is utilized as an indication of temperature.

1 Claim, 1 Drawing Figure

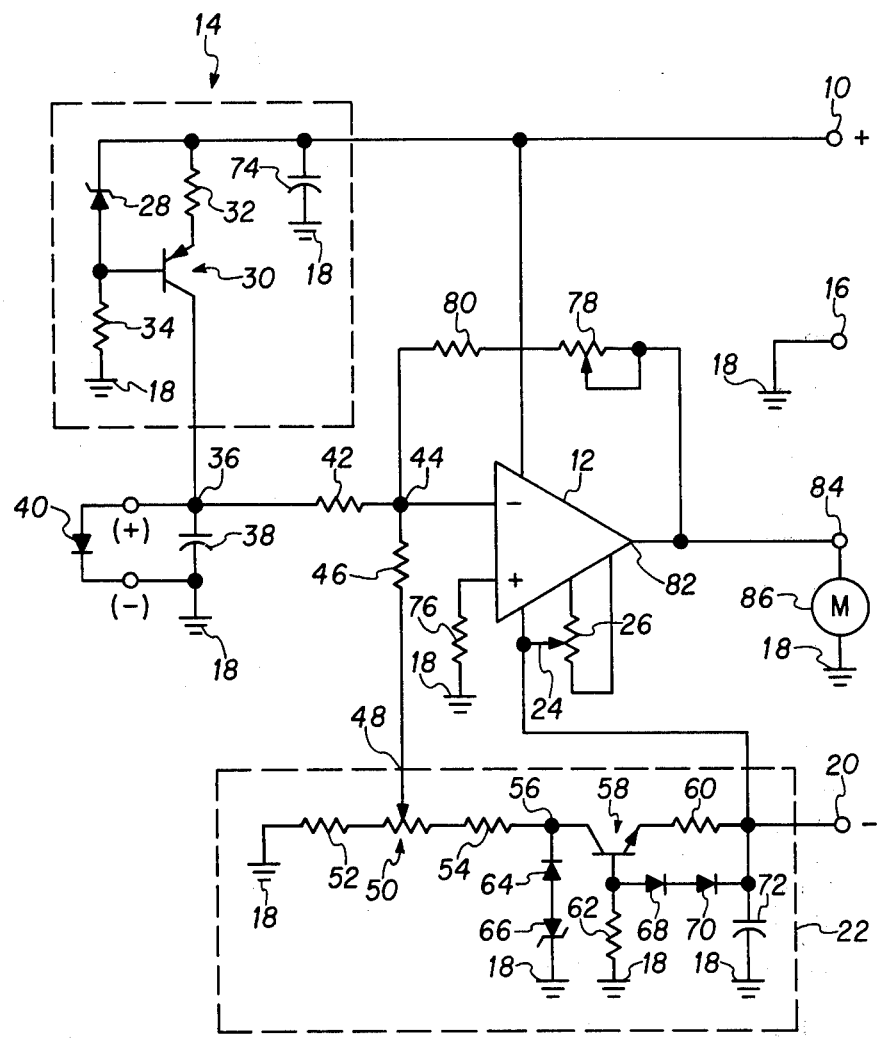

TEMPERATURE MEASURING APPARATUS

THE INVENTION

The present invention is generally concerned with electronics and more specifically with a temperature sensing circuit utilizing a single diode.

While there are prior art electronic temperature indicating circuits, all known circuits utilize a means such as a pair of thermocouples or a pair of matched diodes. The present circuit eliminates the requirement for a pair of temperature sensing devices and further eliminates the requirement for matched components or the equally troublesome bridge circuits that normally accompany prior art circuits.

By using known characteristics of zener diodes, the present invention produces a stable temperature compensated constant current supply for feeding a single diode. This constant current supply assures that the only variation in voltage across the single diode will occur as a result of its thermal coefficient of resistance. In other words, the voltage across this diode will vary only as a function of temperature since the current therethrough is constant. This voltage obtained across the diode is compared with a constant voltage reference which is further explained in a copending application Ser. No. 689,877 filed on even date herewith, now U.S. Pat. No. 4,030,023 in my name and assigned to the same assignee as the present invention. This circuit has excellent temperature compensation without the requirement for matched parts or thermally protected parts. The constant voltage output is compared with the voltage across the sense diode and the resultant is used to provide an indication of temperature.

The design of the present circuit is such that calibration time and effort is considerably reduced.

It is, therefore, an object of the present invention to provide an improved temperature measuring device.

Other objects and advantages of the present invention will be apparent from a reading of the specification and appended claims in conjunction with the single schematic diagram illustrating a preferred embodiment of the inventive comcept.

DETAILED DESCRIPTION

In the FIGURE, a positive power supply terminal 10 supplies power to a differential amplifier 12 and to a constant current generator generally designated as 14. A terminal 16 is connected to ground potential 18 while a negative terminal 20 of the power supply is connected to supply power to a constant voltage supply means 22 as well as to a negative voltage input of the amplifier 12 and to a wiper 24 of a potentiometer having a resistance element 26. Resistance element 26 is connected across appropriate terminals of the amplifier 12 to compensate for offset occurring in the 741 type amplifiers as produced. These 741 amplifiers are produced by a plurality of manufacturers such as National and Fairchild. Within constant current supply means 14, a zener diode 28 has its cathode connected to power supply 10 and its anode connected to a base of a PNP transistor generally designated as 30 having its emitter connected through a resistor 32 to power supply terminal 10. A resistor 34 is connected between the base of transistor 30 and ground 18. The collector of transistor 30 is connected to a junction point 36. A capacitor 38 is connected between junction point 36 and ground 18 and is connected in parallel with a temperature sensing diode 40. Diode 40 is inserted such that its direction of easy current flow is from junction point 36 to ground 18. A resistor 42 is connected between junction point 36 and a junction point 44 which constitutes an input to the negative or inverting input of amplifier 12. A resistor 46 is connected between junction point 44 and an output 48 of the constant voltage means 22. Output 48 is further connected to a wiper of a potentiometer generally designated as 50 and connected at one end through a resistor 52 to ground 18 and at the other end through a resistor 54 to a junction point 56. A transistor generally designated as 58 has its collector connected to junction point 56, its emitter connected through a resistor 60 to terminal 20 and its base connected through a resistor 62 to ground 18. A diode 64 is connected in series with a zener diode 66 between junction point 56 and ground 18. The cathode of zener diode 66 is connected to ground 18 while the cathode of diode 64 is connected to junction point 56. A pair of diodes 68 and 70 are connected in series between the base of transistor 58 and negative terminal 20, such that the direction of easy current flow of both of these diodes is towards terminal 20. A capacitor 72 is connected between terminal 20 and ground 18.

Referring back to constant current circuit 14, a capacitor 74 is connected between terminal 10 and ground 18. A resistor 76 is connected between the positive or noninverting input of amplifier 12 and ground 18. A variable resistance element 78 is connected in series with a resistor 80 between an output 82 of amplifier 12 and junction point 44 to provide feedback signals. Output 82 is connected to an apparatus output terminal 84 and through a meter 86 to ground 18.

OPERATION

In operation, the circuit 14 provides a constant current through the action of having a constant voltage at the base of transistor 30 with respect to its emitter. If the load impedance of diode 40 increases due to a change in temperature, the current flow through transistor 30 and accordingly through resistor 32 is momentarily reduced. The reduced current flow causes a lower voltage drop to appear across resistor 32 thereby increasing the potential between the base and emitter of transistor 30. This action is amplified and causes the collector of transistor 30 to rise in potential considerably toward the potential of terminal 10 and thus restore the current through diode 40 to its initial value. If the voltage of terminal 10 rises with respect to ground, the zener diode 28 maintains the same voltage drop between the base of transistor 30 and terminal 10 such that the increased current flow through resistor 32 reduces the base to emitter voltage and accordingly through the amplified action of transistor 30 keeps the junction point 36 at substantially the same potential with respect to ground 18 as it was before the potential of terminal 10 increased. Similarly, complementary action occurs if the potential at terminal 10 decreases. The circuit of FIG. 14 is standard in the industry as illustrated in *Zener and Avalanche Diodes*, by Carl David Todd, P.E., Copyright 1970 by John Wiley & Sons, Inc., Lib. Congress No. 77-120709 Chapter 3-6. Capacitors 72 and 74 bypass the input voltage lines to maintain dynamic stability (Filter capacitors). Capacitor 38 provides a low impedance path around diode 40 to prevent high frequency noise (RF) from being rectified by diode 40 and causing an error at junction 36.

The diode 28 of the constant current generator 14 in a preferred embodiment was a 1N751 which has nearly a zero temperature coefficient. Thus, this diode in combination with the use of a metal film, temperature stable resistor for resistor 32 in the circuit allows a constant current to be supplied by circuit 14 over a wide range of temperatures for this circuit. It will be realized that the circuit 14 may not be subjected to the same extremes in temperature as is the sensing diode 40 but this circuit as designed produces substantially constant current over a circuit temperature range of −25° C to +55° C.

The constant voltage circuit 22 comprises first a constant current circuit using transistor 58, resistor 60, resistor 62 and diodes 68 and 70 in a manner similar to that of circuit 14. This constant current is then fed through the zener diode 66 which operates as a constant voltage reference or source. To compensate for the temperature variation characteristics of zener diode 66, a diode 64 has been added in its forward direction to substantially compensate for some of the temperature effects of zener diode 66. The diode 68 and 70 do not have the nearly zero temperature coefficient of zener diode 28. However, they are selected in accordance with the formula provided in my referenced application to compensate for the temperature characteristics of the diode 64 and 66 constituting the constant voltage section of circuit 22.

From the above, it will be determined that a constant voltage being supplied across the combination of resistors 50-54 will produce a constant voltage output at output 48. The constant voltage output as compared to the varying voltage appearing across diode 40 due to temperature variations produces changes at the inverting input of amplifier 12.

The output of amplifier 12 is applied to a meter 86 which may be an analog-to-digital meter or any other meter for providing a linearly varying indication as the temperature and accordingly the amplifier input voltage changes.

As previously indicated, the calibration of this circuit is extremely simple. There are three basic steps to produce a calibrated unit. First, the junction points 36 and 48 are grounded and the wiper 24 is adjusted to produce zero offset. The grounds are removed from junction points 36 and 48 and the sense diode is placed in a known cold reference such as a beaker of ice water to establish a cold reference such as 0° C. The potentiometer 50 is then adjusted to provide a zero (0° C) reference output potential to the meter 86.

In one embodiment of the invention, the output at terminal 84 varied at the rate of 10 millivolts per °C. Thus, the variable resistor 78 was adjusted to obtain a gain of 5 through amplifier 12. This is accomplished through calibration by inserting the diode 40 in a hot reference such as boiling water at standard conditions and the variable resistor 78 is adjusted to give a reading of 100° C (1.0 volt) on the meter 80.

Unlike bridge circuits and other prior art temperature measuring circuits there is no requirement for repeatedly fine tuning the circuit to obtain a highly accurate and temperature stable measuring apparatus.

As will be noted, the present circuit does not require the use of any exotic components or matching of components to obtain a stable circuit. While the resistor 32 should be a metal film resistor for its temperature stable characteristics, and the diode 28 in the preferred embodiment was a 1N751 which happens to have a nearly 0 temperature coefficient of voltage versus temperature, the remaining components of this circuit are very standard components.

Although a single preferred embodiment of the inventive concept has been disclosed, it will be realized by those skilled in the art that the specific circuitry used to implement the constant voltage and constant current generators may be altered to practice the invention. Thus, I wish to be limited only by the scope of the appended claims.

What is claimed is:

1. Temperature indicating means comprising, in combination:

power supply means including ground means and first and second power terminal means;

constant current transistor means including an emitter resistively connected to said first power terminal means, a base connected through a zener diode to said first power terminal means and a collector;

temperature sensing diode means connected between said collector and said ground means;

temperature compensated constant voltage reference means including output means for supplying a constant voltage reference over a wide range of temperatures with respect to said ground means, said constant voltage reference means including, constant current second transistor means including an emitter resistively connected to said second power terminal means, a base connected through voltage dropping diode means to said second power terminal means and a collector connected through a series connection of a temperature compensating diode means, and a second zener diode means to said ground means, and potentiometer means connected between said collector of said second transistor means and said ground means and having a wiper connected to the output means thereof; and summing means connected to said temperature sensing diode means and to said output means for providing an output indication of temperature of said sensing diode means as a function of the voltage across said sensing diode means as compared to said reference voltage.

* * * * *

UNITED STATES PATENT AND TRADEMARK OFFICE
CERTIFICATE OF CORRECTION

PATENT NO. : 4,047,435

DATED : September 13, 1977

INVENTOR(S) : John L. Keith

It is certified that error appears in the above-identified patent and that said Letters Patent are hereby corrected as shown below:

Column 1, line 43, delete "comcept" and substitute therefor --concept--.

Column 4, line 2, after "circuits" insert a comma (,).

Signed and Sealed this

Fourteenth Day of March 1978

[SEAL]

Attest:

RUTH C. MASON
Attesting Officer

LUTRELLE F. PARKER
Acting Commissioner of Patents and Trademarks